(12) United States Patent
Ackerman et al.

(10) Patent No.: US 7,016,097 B2
(45) Date of Patent: Mar. 21, 2006

(54) OPTICAL DEVICE WITH A TEMPERATURE INSENSITIVE OPTICAL PATHLENGTH

(75) Inventors: David A. Ackerman, Hopewell, NJ (US); Charles D. Brandle, Jr., Basking Ridge, NJ (US); Glen R. Kowach, Fanwood, NJ (US); Lynn F. Schneemeyer, Westfield, NJ (US)

(73) Assignee: Triquint Technology Holding Co., Hillsboro, OR (US)

( * ) Notice: Subject to any disclaimer, the term of this patent is extended or adjusted under 35 U.S.C. 154(b) by 916 days.

(21) Appl. No.: 10/036,397

(22) Filed: Jan. 7, 2002

(65) Prior Publication Data

US 2003/0128990 A1    Jul. 10, 2003

(51) Int. Cl.
G02F 1/01     (2006.01)
G02F 1/07     (2006.01)
H04J 14/02    (2006.01)
H01S 3/13     (2006.01)

(52) U.S. Cl. .................... 359/288; 359/260; 359/244; 398/79; 398/201; 372/32

(58) Field of Classification Search ............... 359/288, 359/260, 244; 398/79, 201; 372/20, 32; 385/12, 16, 142
See application file for complete search history.

(56) References Cited

U.S. PATENT DOCUMENTS

| 3,381,225 | A | * | 4/1968 | Alfeev | 455/254 |
| 4,749,254 | A | * | 6/1988 | Seaver | 385/12 |
| 5,245,689 | A | * | 9/1993 | Gualtieri | 385/142 |
| 6,486,999 | B1 | * | 11/2002 | Ackerman et al. | 359/288 |

* cited by examiner

Primary Examiner—Loha Ben
(74) Attorney, Agent, or Firm—Dickstein Shapiro Morin & Oshinsky LLP

(57) ABSTRACT

The thermo-optic behavior of an optical path over a range of temperatures is controlled by determining a figure of merit (FoM) for the optical path and including in the path a body of $NaBi(Mo_{1-x}W_xO_4)_2$ crystalline material that enables the conditions specified by the FOM to be satisfied. The $NaBi(Mo_{1-x}W_xO_4)_2$ crystalline material is highly transparent at a wavelength of radiation propagating in the path, and has a coefficient of thermal expansion (CTE) and a refractive index n such that the CTE and dn/dT of the etalon compensate one another so as to perform frequency discrimination that is essentially temperature insensitive over the range ΔT. The $NaBi(Mo_{1-x}W_xO_4)_2$ crystalline material exhibits temperature independent transmission characteristics at about room temperature and at a wavelength of about 1550 nm.

16 Claims, 5 Drawing Sheets

OPTICAL DEVICE WITH A TEMPERATURE INSENSITIVE OPTICAL PATHLENGTH

FIELD OF THE INVENTION

This invention relates to optical devices and systems and, in particular, to the thermo-optic behavior of optical paths within such devices and systems.

BACKGROUND OF THE INVENTION

Optical devices are sensitive to changes in temperature. For example, the output wavelength, the optical power output and the current threshold of a semiconductor laser are sensitive to temperature. Similarly, the effective refractive indices of optical modes in a semiconductor or glass waveguide also change with temperature. Typically, optical devices and systems are designed to account for such thermally-induced shifts, at least in those device/system parameters that are the most important for proper performance of the device/system.

Dense wavelength divisional multiplexed (DWDM) systems boost information-carrying capacity by employing multiple sources of differing wavelength to broadcast multiple signals over a single fiber. As the density of the fiber channels increases, the requirements of wavelength stability of each channel becomes more stringent. Currently, DWDM systems use channels spaced apart by 50 or 100 GHz. To achieve wavelength stability over a 25-year system lifetime, optical sources need wavelength stabilization. One way to provide such wavelength stabilization is by controlling the thermo-optic behavior of the system components over an operating temperature range $\Delta T$.

In a DWDM system, the channel wavelengths are packed together at minimal spacing. Therefore, any significant drift in the output wavelength of the lasers (used as carrier signal sources) poses serious problems. One source of wavelength drift is aging of the lasers. Wavelength changes due to aging can be corrected by changing the temperature of the laser by a thermoelectric cooler/heater (TEC). Although the wavelength of each laser can be controlled by an etalon used as a frequency discriminator, the optical path length of the etalon is also temperature sensitive. Thus, changing the temperature of the laser might also change the temperature of the etalon if the two devices are located in the same package. Nevertheless, other phenomena can also affect the temperature of the etalon and hence its optical path length. For example, (1) aging of the temperature control circuit used to maintain the laser at a predetermined temperature and at a predetermined output wavelength, and/or (2) the temperature gradient produced across the etalon because the TEC is typically located on the base of the etalon could also affect the temperature of the etalon.

Accordingly, there is a need for controlling the thermo-optic behavior of an optical path within optical devices and over a temperature range. There is also a need for an optical etalon used as wavelength discriminator that is essentially temperature insensitive over the temperature operating range of the corresponding optical system.

BRIEF SUMMARY OF THE INVENTION

In accordance with one aspect of the invention, a method of controlling the thermo-optic behavior of an optical path over a range of temperatures $\Delta T$ comprises the steps of determining a figure of merit (FoM) (fractional change in optical pathlength with respect to temperature) for the optical path and including in the path an optical etalon of $NaBi(Mo_{1-x}W_xO_4)_2$ crystalline material that enables the conditions specified by the FoM to be satisfied. The NaBi $(Mo_{1-x}W_xO_4)_2$ (sodium bismuth molybdate-tungstate) crystalline material is highly transparent at a wavelength of radiation propagating in the path, and has a coefficient of thermal expansion (CTE) and a refractive index n such that the CTE and dn/dT of the etalon compensate one another over a temperature range $\Delta T$. In one embodiment, the CTE and dn/dT of the etalon compensate one another to perform frequency discrimination that is essentially temperature insensitive over that range $\Delta T$.

In accordance with another aspect of our invention, a semiconductor device such as an apparatus, subassembly, subsystem, system comprises an optical path over which radiation at a wavelength propagates and an optical etalon of $NaBi(Mo_{1-x}W_xO_4)_2$ crystalline material disposed in the path that enables the conditions specified by the FoM to be satisfied. The $NaBi(Mo_{1-x}W_xO_4)_2$ crystalline material is highly transparent at a wavelength $\lambda$ of radiation propagating in the path and has a coefficient of thermal expansion (CTE) and refractive index n such that the CTE and dn/dT are mutually adapted to satisfy the specifications upon the FOM over a temperature range $\Delta T$.

DETAILED DESCRIPTION OF THE INVENTION

In the following detailed description, reference is made to various specific embodiments in which the invention may be practiced. These embodiments are described with sufficient detail to enable those skilled in the art to practice the invention, and it is to be understood that other embodiments may be employed, and that various structural, logical and electrical changes may be made without departing from the spirit or scope of the invention.

The term $NaBi(Mo_{1-x}W_xO_4)_2$ (sodium bismuth molybdate-tungstate) is intended to include not only elemental $NaBi(Mo_{1-x}W_xO_4)_2$ but $NaBi(Mo_{1-x}W_xO_4)_2$ with other trace metals or in various alloyed combinations with other metals as known in the optical, electronic, and semiconductor industry, as long as the optical properties of the $NaBi(Mo_{1-x}W_xO_4)_2$ remain unchanged.

Figure 1:
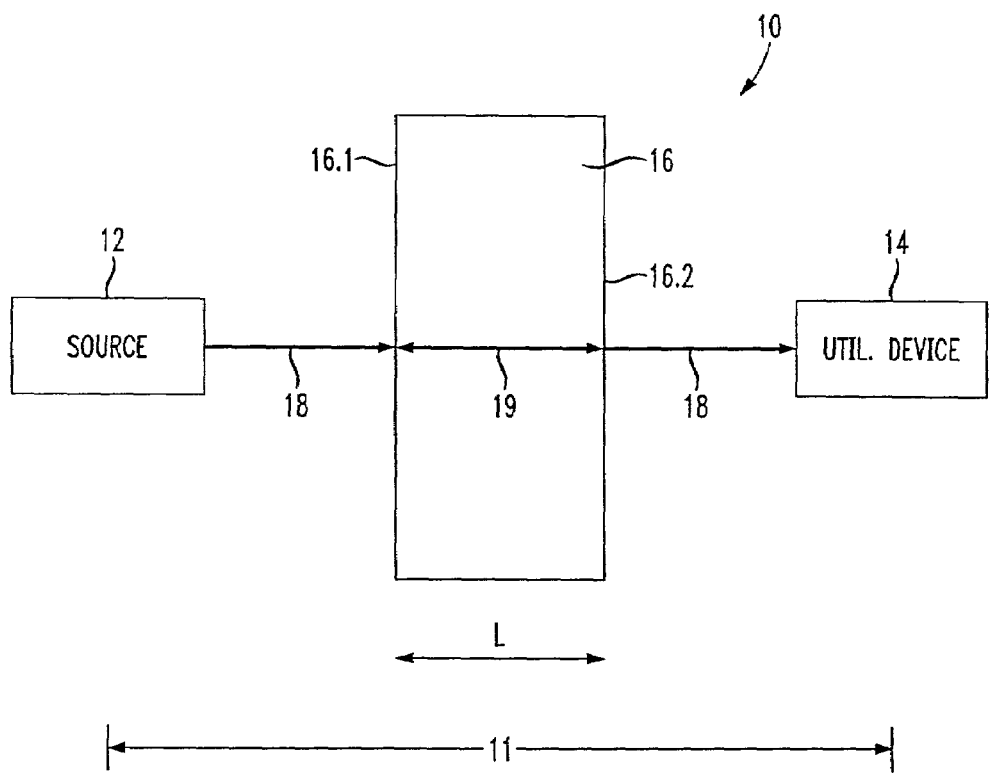
FIG. 1 illustrates a schematic, block-diagrammatic view of an apparatus which includes an etalon that may be used as a frequency discriminator in accordance with an embodiment of the present invention.

Referring to the drawings, where like elements are designated by like reference numerals, FIG. 1 shows an apparatus 10, for example an optical device, subassembly, subsystem, system, among others, that includes an optical path 11 defined by a source of radiation 12, a utilization device 14 and a transmission medium 18 which couples them to one another. In accordance with one aspect of the present invention, a figure of merit (FoM) is defined for the optical path 11, and a body 16 of NaBi(Mo$_{1-x}$W$_x$O$_4$)$_2$ crystalline material is disposed in the path so that the specification upon the FoM is satisfied. More specifically, the NaBi(Mo$_{1-x}$W$_x$O$_4$)$_2$ material is highly transparent at a wavelength of the radiation propagating in the path 11, and has a coefficient of thermal expansion (CTE) and a refractive index n such that the CTE and dn/dT are mutually adapted to satisfy the specification upon the FoM over a temperature range ΔT.

The source 12 may include an active device, for example a semiconductor laser, or a passive device, for example an optical waveguide through which an optical radiation signal propagates. Alternatively, the source 12 may include an object from which optical radiation is reflected or scattered, or a combination of active and passive devices. Similarly, the utilization device 14 may include a photodetector, an optical receiver, an optical waveguide, an optical isolator, an optical coupler or multiplexor, a piece of terminal equipment, or a combination of them. The transmission medium 19 may include, for example, an air path, an optical fiber, or an integrated optical waveguide (as in the planar waveguides of silicon optical bench or semiconductor technology, for example).

Figure 6:
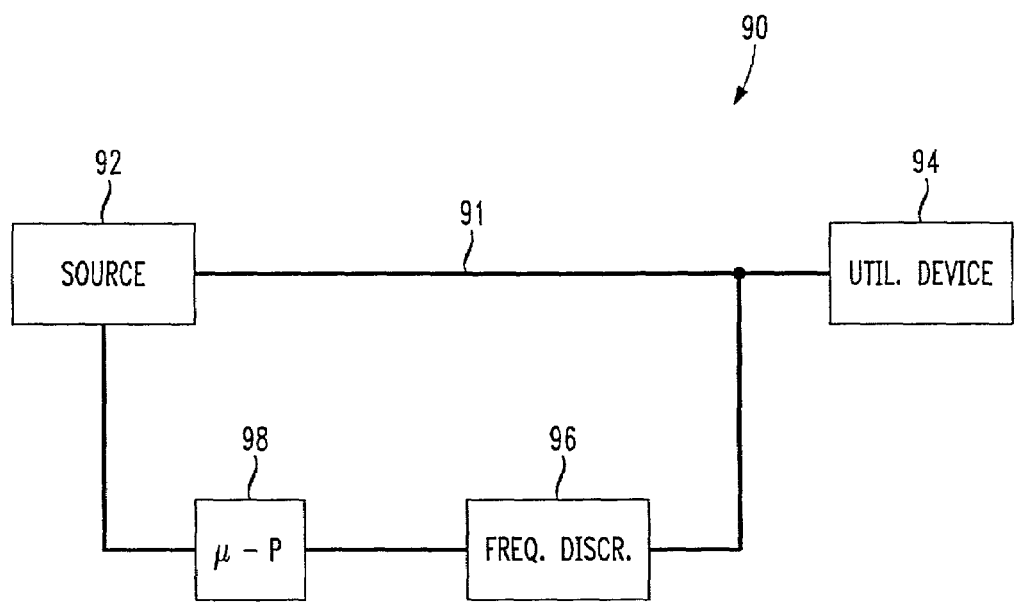
FIG. 6 is a block-diagrammatic view of an optical transmitter in accordance with one embodiment of the present invention.

A typical optical transmitter 90 that incorporates some of the components of FIG. 1 is illustrated in FIG. 6. A tunable source 92 is coupled to a utilization device 94 via an optical fiber 91. A portion of the laser output is tapped by a coupler (not shown) to provide an output to frequency discriminator 96. The latter includes an optical etalon as the principal filtering element, as is well known in the art. The output of the frequency discriminator is provided to microprocessor 98 that generates an error signal to control the wavelength of source 92 (for example, via its temperature and/or its drive current). Thus, the coupler, the discriminator 96 and the microprocessor 98 form a feedback loop that controls the source wavelength. This type of transmitter is described in more detail by D. A. Ackerman in patent application Ser. No. 09/330,389 filed on Jun. 6, 1999, which is incorporated herein by reference.

Referring back to FIG. 1 and in accordance with an embodiment of the present invention, the device 10 provides a frequency discrimination function. For this, the source 12 typically comprises a semiconductor laser, the utilization device 14 typically comprises a photodetector as part of an optical receiver, the body 16 of NaBi(Mo$_{1-x}$W$_x$O$_4$)$_2$ crystalline materials serves as an optical etalon, and the transmission medium is air. As known in the art, an etalon includes essentially parallel input and output surfaces 16.1 and 16.2, respectively, that form a resonator of length L. These surfaces are typically coated to be partially transmissive and partially reflective to the radiation from source 12. When that radiation is coupled into the etalon through the input surface 16.1, a standing wave pattern is formed as designated by the double-headed arrow 19. Consequently, the transmission properties of the etalon are characterized by the well-recognized comb-like functions shown in FIG. 2. Thus, maximum transmission of radiation through the etalon occurs only at certain wavelengths that are spaced apart by c/2 nL, where c is the speed of light in a vacuum, n is the group refractive index of the NaBi(Mo$_{1-x}$W$_x$O$_4$)$_2$ crystalline material of body 16, and L is the separation of the surfaces as measured along the direction of radiation propagation. At wavelengths in between the maxima, the amount of radiation that is transmitted through the etalon decreases dramatically.

Figure 2:
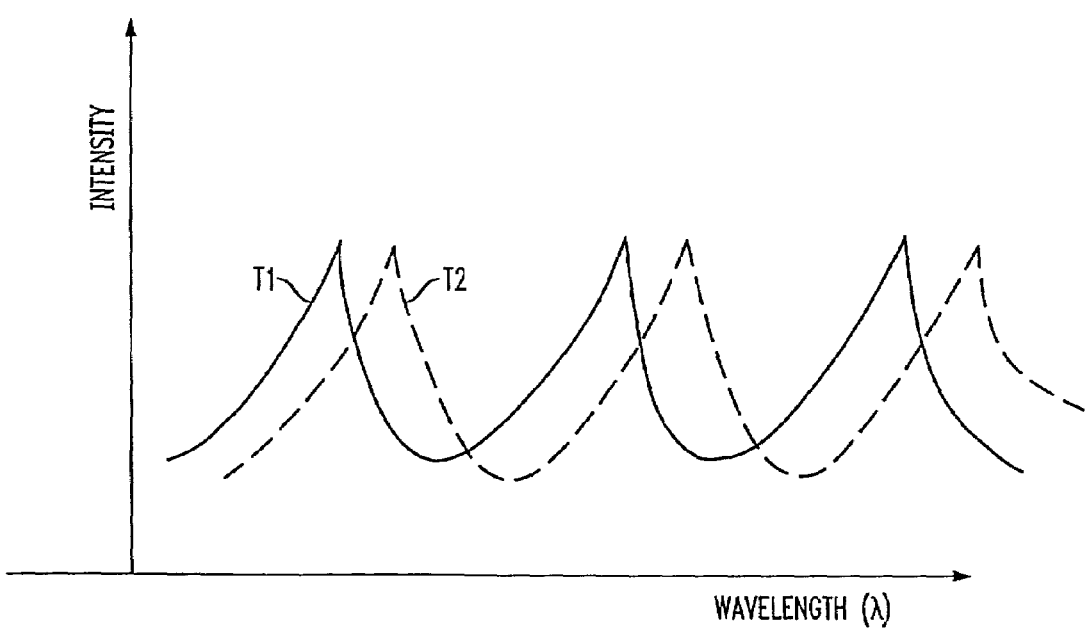
FIG. 2 illustrates a schematic view of the comb-like frequency characteristics of an etalon as a function of temperature.

Thus, the optical etalon operates to filter out signals at wavelengths other than those that are coincident, or nearly so, with the maxima in the etalon transmission characteristic, which may be used to stabilize the wavelength of the source 12. Nevertheless, an etalon may be subjected to changes in temperatures that cause the transmission characteristic to shift, as shown in FIG. 2. The curve labeled T$_1$ (FIG. 2) shifts to longer wavelengths (curve labeled T$_2$) when the temperature of the etalon increases from T$_1$ to T$_2$. Similarly, a decrease in temperature would cause the curves to shift to shorter wavelengths. Such changes in temperature could result from a variety of sources. For example, the ambient temperature of the system in which the etalon is located could change due to natural causes (for example, weather), or the temperature of the laser (which is often located in the same package as the etalon) could be changed intentionally as part of a wavelength tuning protocol (for example, in a WDWM system), resulting in a change of the temperature of the etalon, or the temperature control circuit could be imperfect due to its aging slowly or changing suddenly. In any case, temperature-induced shifts in the transmission characteristics of the etalon are undesirable, as significant shifts may cause the system performance to degrade to a level outside of system specifications.

In accordance with one embodiment of the present invention, the change in optical path length through the NaBi(Mo$_{1-x}$W$_x$O$_4$)$_2$ etalon due to thermal expansion is balanced, or nearly so, by the temperature-induced change in its reflective index given by dn/dT, so that the NaBi(Mo$_{1-x}$W$_x$O$_4$)$_2$ etalon is made to be essentially temperature insensitive. The balancing is expressed using the equation for optical pathlength L$_0$ given by equation (1):

$$L_0 = nL \quad (1)$$

wherein:

L$_0$=optical pathlength of etalon;

n=refractive index; and

L=length of the sample and where the optical path in this case is to be only the path segment defined by the etalon itself (not the entire path 11 shown in FIG. 1). The derivative of equation (1) with respect to temperature is expressed as equation (2):

$$\frac{dL_0}{dT} = n\left(\frac{dL}{dT}\right) + L\left(\frac{dn}{dT}\right) \quad (2)$$

$$= nL\left[\left(\frac{1}{L}\right)\left(\frac{dL}{dT}\right) + \left(\frac{1}{n}\right)\left(\frac{dn}{dT}\right)\right]$$

Since, by definition, the coefficient of thermal expansion (CTE) is defined as:

$$CTE = (1/L)(dL/dT) \quad (3)$$

it results that $$dL_0/dT = nL[CTE + (1/n)(dn/dT)] \quad (4)$$

Finally, we define a figure of merit FoM as the fractional change in optical pathlength with respect to temperature as follows:

$$FoM=(1/L_0)(dL_0/dT) \quad (5)$$

and substituting equations (1) and (4) into equation (5) we obtain:

$$FoM=CTE+(1/n)(dn/dT) \quad (6)$$

which has units of ppm/K (i.e., parts-per-million per degree Kelvin). For the crystalline material of the etalon to be temperature insensitive, FoM must essentially equal zero (FoM≅0), which reduces equation (6) to:

$$CTE=-(1/n)(dn/dT) \quad (7)$$

Thus, in the ideal case, the CTE and $(1/n)(dn/dT)$ of the crystalline material should be of the same magnitude and of opposite sign. Depending on system considerations, however, less than perfect equality may be acceptable. Accordingly, the present invention is not limited to a temperature insensitive etalon characterized by an FoM which is essentially equal to zero (FoM≅0), and the invention contemplates a relatively temperature insensitive etalon characterized by a "small" FoM, that is an FoM which is within the range of about [−2, 2] (FoM ∈[−2, 2] or ~|FoM|<2). In addition, the material should have high transparency over a predetermined wavelength range of operation ΔL of the etalon and dn/dT should be relatively insensitive to temperature and wavelength; i.e., $d/dT(dn/dT)$ and $d/d\lambda(dn/dT)$ should be essentially constant over the operating range of interest.

Optical Etalon Preparation

According to an embodiment of the present invention, crystals of $NaBi(Mo_{1-x}W_xO_4)_2$ (sodium bismuth molybdate-tungstate) in tetragonal scheelite phase were grown from $NaBi(Mo_{1-x}W_xO_4)_2$ molten liquid using the Czochralski growth technique, which is commonly used to produce large, high quality, single crystal sample of congruently melting oxides. Starting materials were prepared by grinding stoichiometric mixtures of alkali carbonate with bismuth oxide, tungsten oxide and molybdenum oxide. High purity starting materials, typically 5N, were used. After grinding, the powder was pressed to 10,000 psi in an isostatic press. Starting materials were placed in a platinum-lined boat and heated slowly to about 550° C. in a box furnace to react the carbonate. The 550° C. temperature is well below the melting temperature of the solid solution samples.

Using the above starting materials in an RF-heated Czochralski crystal growth furnace, crystals of $NaBi(Mo_{1-x}W_xO_4)_2$ with a diameter of about 20 mm and a weight of about 150 g have been grown using an iridium-wire to initiate growth. The lower two-thirds of a typical boule is composed of a few large grains. Melting temperatures increase from 865° C. for the molybdate to 930° C. for the tungstate. These low melting temperatures indicate that the crystals could be grown in air using platinum crucibles although iridium crucibles and $N_2/1.8\%$ $O_2$ atmospheres have been used for growth experiments carried out so far.

Samples of $NaBi(Mo_{1-x}W_xO_4)_2$ with values of x={0, 0.05, 0.10, 0.15, 0.25, 0.50 and 1.0} were cut from crystalline sections of the boules to make etalons. Crystals were oriented with the c-axis parallel to the optical axis to within 2° using Laue diffraction. Rectangular solids of about 3–4 mm on a side were prepared with 1–2 mm thickness. Opposing faces were polished flat and parallel using standard diamond polishing techniques. Values of FoM data measured along the c-axis are given in Table 1 below:

TABLE 1

| Material | T Melt ° C. | n | λ nm | Dn/dt (ppm/K) | CTE (ppm/K) | FoM |
|---|---|---|---|---|---|---|
| $NaBi(MoO_4)_2$ | 865 | 2.2 | 1550 | −58.8 | 25.9 | −1.80 |
| $NaBi(WO_4)_2$ | 925 | 2.2 | 1550 | −46.9 | 23.8 | 5.45 |
| $NaBi(Mo_{0.75}W_{0.25}O_4)_2$ | ~900° | 2.2 | 1550 | −55.8 | 25.2 | −0.40 |

Results and Conclusion

Figure 3:
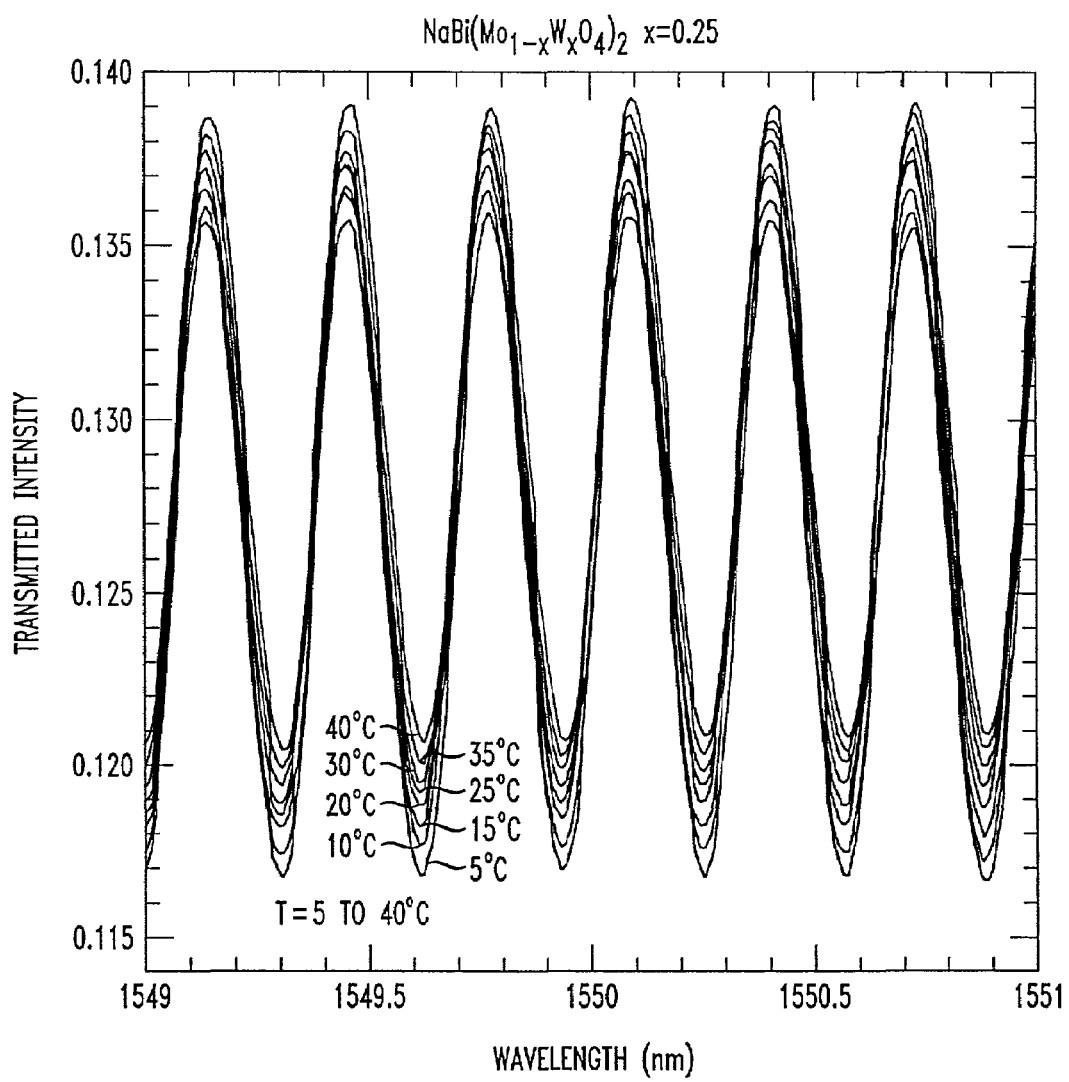
FIG. 3 illustrates a graph of the transmission characteristics of a $NaBi(Mo_{1-x}W_xO_4)_2$ etalon as a function of temperature.

Samples of $NaBi(Mo_{1-x}W_xO_4)_2$ with values of tungsten (W) percentage x={0, 0.05, 0.10, 0.15, 0.25, 0.50 and 1.0} were obtained as described above. Subsequently, transmission characteristics of each etalon were measured by passing 1549 nm to 1551 nm light from a tunable external cavity laser through the etalon and sensing it with a p-i-n detector coupled to a transimpedance amplifier. Transmission characteristics of a $NaBi(Mo_{1-x}W_xO_4)_2$ sample for which x=0.25 are shown in FIG. 3 for temperatures of 5° C. to 40° C. in increments of 5° C. The spectra of FIG. 3 are observed to be almost stationary as a function of temperature, suggesting temperature independence and the efficacy of $NaBi(Mo_{1-x}W_xO_4)_2$ with x=0.25 for temperature insensitive etalon applications.

As illustrated in FIG. 3, the transmitted intensity of radiation through the $NaBi(Mo_{1-x}W_xO_4)_2$ etalon at various wavelengths in the range of about 1549 nm to about 1551 nm is shown as a function of various temperatures in the range of about 5° C. to about 40° C. The family of curves of FIG. 3 demonstrates that, as the temperature increases, the transmission curves do not shift to lower or higher wavelengths, remaining therefore completely independent of temperature change. A slight vertical offset is observed between each spectrum due to temperature dependence or sensitivity of the p-i-n detector. Although the units of transmission are in terms of transimpedance amplifier voltage, it is worth noting that the received signal in the absence of a sample is of about 0.15 V at room temperature. Thus, the most transmissive portions of the spectrum show total losses of less than 10% including scattering, steering of the beam away from the detector, and absorption.

Figure 4:
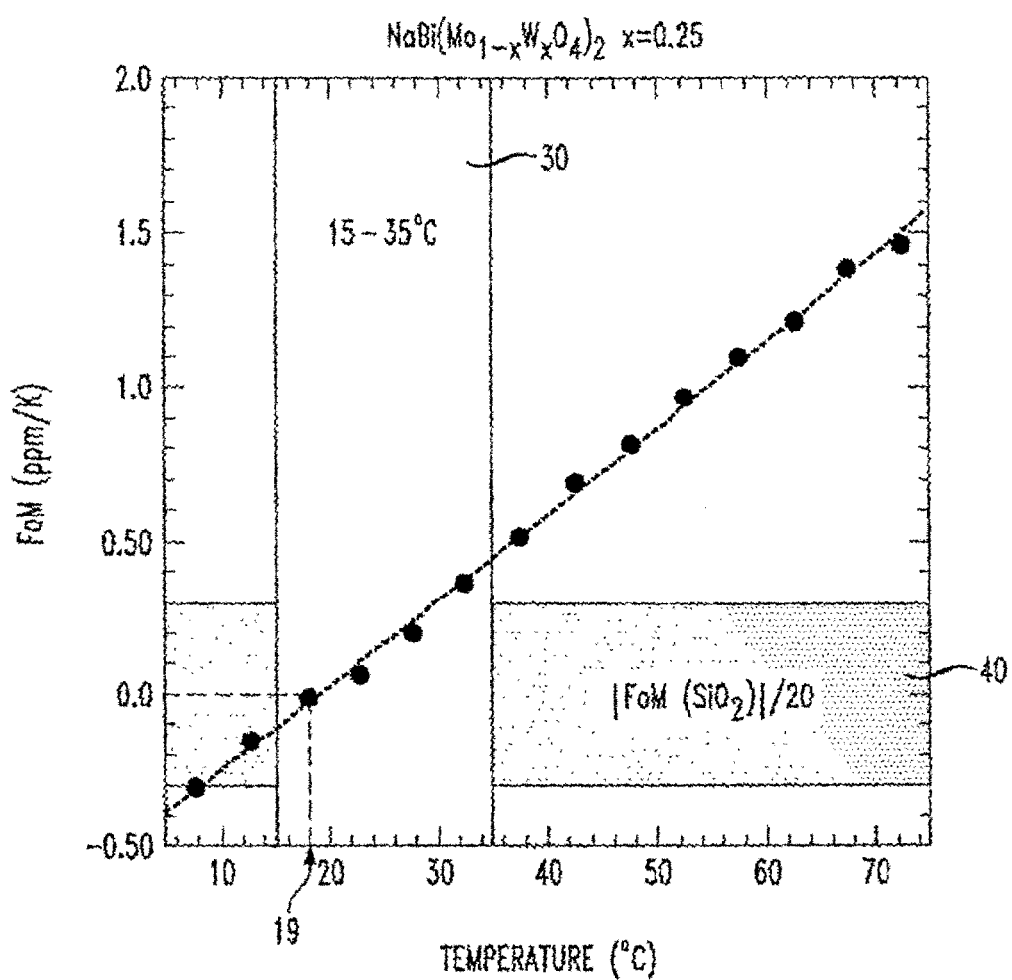
FIG. 4 illustrates a graph of the figure of merit FoM for a $NaBi(Mo_{1-x}W_xO_4)_2$ etalon with x=0.25 as a function of temperature.

FIG. 4 illustrates the figure of merit (FoM) of a $NaBi(Mo_{1-x}W_xO_4)_2$ etalon sample with x=0.25 as a function of temperature. The FoM values for the $NaBi(Mo_{1-x}W_xO_4)_2$ etalon sample with x=0.25 are shown in FIG. 4 as a function of various temperatures in the range of about 5° C. to about 75° C. A temperature dependency of FoM of about 0.028 ppm/$K^2$ is observed, indicating that the temperature dependencies of thermal expansion and fraction change of index are different although they cancel exactly at 19° C. A broad vertical region 30 in FIG. 4 denotes the temperature range over which the value of FoM should be small for wavelength stabilizer applications. A horizontal region 40 (FIG. 4) denotes the absolute value of FoM as being less than 20 times smaller than that of silicon oxide ($SiO_2$) or fused silica (of about 6 ppm/K), which are often used as a conventional etalon materials. The data of FIG. 4 demonstrates that the FoM of the $NaBi(Mo_{1-x}W_xO_4)_2$ etalon sample with x=0.25 could be tuned to zero, conferring superior properties over the silicon oxide or fused silica etalons.

Figure 5:
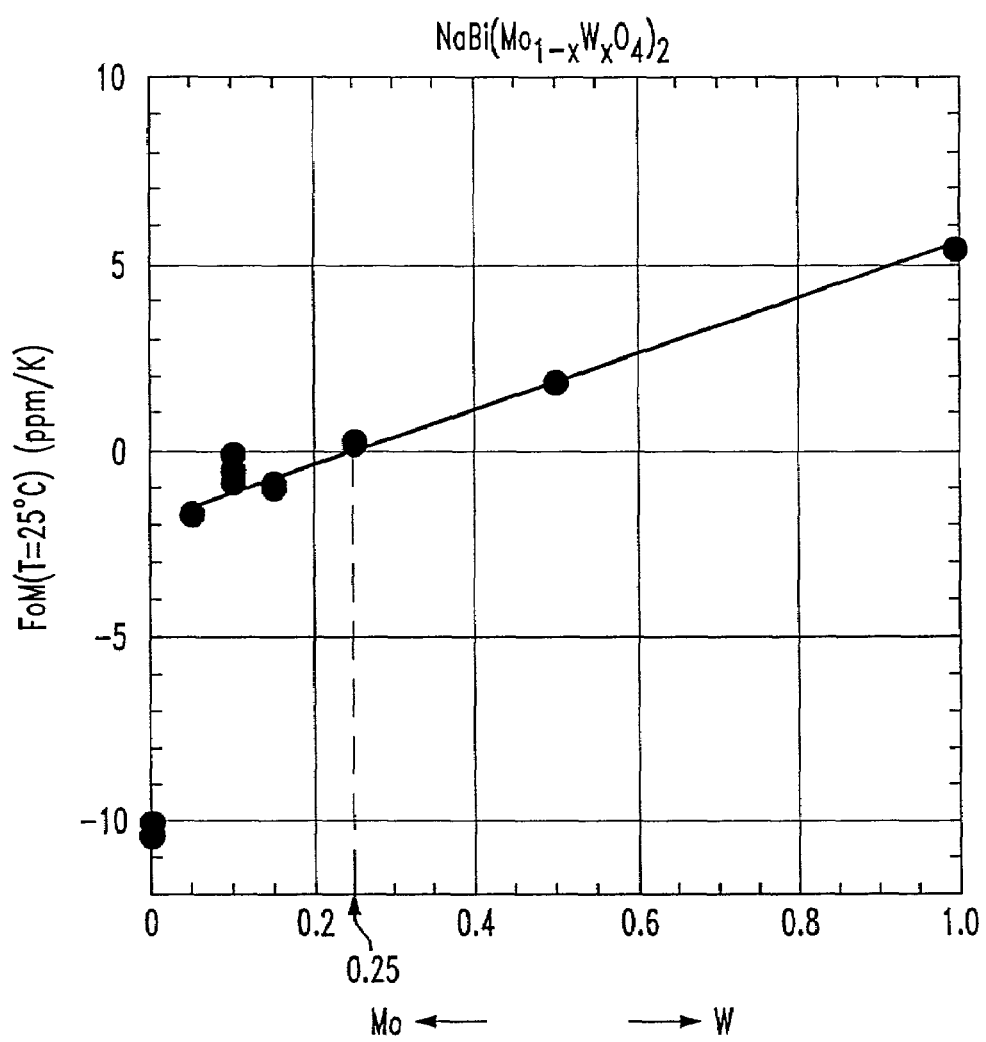
FIG. 5 illustrates a graph of the figure of merit FoM for a $NaBi(Mo_{1-x}W_xO_4)_2$ etalon at a temperature of about 25° C. and as a function of compositional parameter.

FIG. 5 illustrates the FoM values for $NaBi(Mo_{1-x}W_xO_4)_2$ etalons at temperatures of about 25° C. and as a function of compositional parameter tungsten (W) percentage (x %). Each sample was subjected to similar analysis to the one described above. Multiple points at a given tungsten (W)

fraction (x) value correspond to completely independent runs performed on the same sample. The linear fit observed in FIG. 5 excludes the 10% sample due to noise. The slope was calculated to 0.075 ppm/K per percent tungsten (W). Thus, to achieve a tolerance of ±0.1 ppm/K in FoM at a temperature of about 25° C., an easily attainable compositional accuracy in the tungsten (W) percentage x of about 1% is required.

Shift in wavelength of an etalon transmission spectrum for a given change in temperature is a "bottom line" test of a temperature insensitive etalon. Quantitative comparison of a $NaBi(Mo_{1-x}W_xO_4)_2$ etalon and one of fused silica or $LiCaAlF_6$ can be made using data of FIG. 5. For this application, we assume that FoM of fused silica and $LiCaAlF_6$ are 6.25 ppm/K and −1.55 ppm/K, respectively, independent of temperature. Starting with the definition of $FoM=(1/L_0)(dL_0/dT)$ given above in equation (5), $$\delta L_0 = L_0 * FoM(T) * \delta T \qquad (8)$$

Integrating equation (8) and assuming small change in $L_0$ (T), $$\delta L_{0_{T1}}^{T2} \approx L_0 * \int_{T1}^{T2} dT * FoM(T) \qquad (9)$$

Using a linear fit of data from FIG. 4, $$FoM=(dFoM/dT)*(T-T_0) \qquad (10)$$

in which $T_0$ is the temperature at which FoM=0.

Substituting this linear form of FoM given by equation (10) into equation (8) gives:

$$\delta L_0 = L_0 * (dFoM/dT) * (\overline{T}-T_0) * \Delta T \qquad (11)$$

in which $\overline{T}$ and $T_0$ are average temperature $(T_1+T_2)/2$ and change in temperature $(T_2-T_1)$, respectively.

Putting data into equation (11), average wavelength=1550 nm, FoM slope=0.028 ppm/K², $T_1=15°$ C. and $T_2=35°$ C. (so that average temperature is 25° C. and the temperature change $\Delta T$ is 20° C). From FIG. 4, we observe that $T_0=19°$ C. rather than the ideal value of 25° C. Equation (11) gives a shift in wavelength ($\delta\lambda$) of 5.3 pm, where the shift from 15° C. to 19° C. is opposite in sense to that from 19° C. to 35° C., which can be seen in FIG. 3. In the worst case, a change from 19° C. to 35° C. alone causes a shift in wavelength of 5.5 pm. Were To is adjusted to 25° C., via a few percent change in tungsten (W) percentage x, then the maximum expected wavelength shift through the 15° C. to 35° C. range (corresponding to 15–25° C. or 25–35° C.) would be 2 pm. Corresponding shifts in wavelength of fused silica and $LiCaAlF_6$ etalon transmission spectra caused by 15–35° C. temperature changes are 193 pm and −48 pm, respectively. Thus, over the 15–35° C. range, the current $NaBi(Mo_{1-x}W_xO_4)_2$, x=0.25, etalon characteristics shift by about 35 times less than fused silica and about 10 times less than $LiCaAlF_6$ etalons.

The $NaBi(Mo_{1-x}W_xO_4)_2$ etalons of the present invention show superior temperature insensitivity of the material with x=0.25, compared to fused silica and $LiCaAlF_6$ etalons. For the 15–35° C. applications in wavelength stabilizers, variations of transmission characteristics of $NaBi(Mo_{1-x}W_xO_4)_2$ etalons are expected to change no more than 5.5 pm, an amount corresponding to a small 1.4% of a 50 GHz-channel spacing. Thus, $NaBi(Mo_{1-x}W_xO_4)_2$ etalon transmission characteristic can be considered temperature independent.

While the invention has been described and illustrated with reference to specific embodiments, the present invention is not limited to the details of the specific embodiments. Accordingly, the above description and drawings are only to be considered illustrative of exemplary embodiments which achieve the features and advantages of the present invention. Modifications and substitutions to specific process conditions and structures can be made without departing from the spirit and scope of the present invention. Accordingly, the invention is not to be considered as being limited by the foregoing description and drawings, but is only limited by the scope of the appended claims.

What is claimed as new and desired to be protected by Letters Patent of the United States is:

1. A method of controlling the thermo-optic behavior of an optical path over a temperature range comprising the steps of:
   determining specifications upon a figure of merit (FoM) for said path; and
   including a body of $NaBi(Mo_{1-x}W_xO_4)_2$ crystalline material in said path, said body of $NaBi(Mo_{1-x}W_xO_4)_2$ crystalline material having a coefficient of thermal expansion (CTE) and a refractive index change with temperature (dn/dT) that are mutually adapted to satisfy at least one FoM specification over said temperature range.

2. The method of claim 1, wherein said optical path is defined by a temperature insensitive $NaBi(Mo_{1-x}W_xO_4)_2$ etalon and said FoM is determined to be CTE+(1/n)(dn/dT), where n is the refractive index of the crystalline material of said $NaBi(Mo_{1-x}W_xO_4)_2$ etalon and said FoM is small or essentially zero.

3. The method of claim 2, wherein dn/dT is relatively insensitive to temperature and wavelength over a predetermined operating range.

4. The method of claim 1, wherein x=0.25 and said FoM is essentially zero.

5. A device comprising:
   an optical path characterized by a figure of merit (FoM); and
   a body of $NaBi(Mo_{1-x}W_xO_4)_2$ crystalline material disposed in said path, said body of $NaBi(Mo_{1-x}W_xO_4)_2$ crystalline material having a coefficient of thermal expansion (CTE) and a refractive index change with temperature (dn/dT) that are mutually adapted to satisfy an FoM specification over a temperature range.

6. The device of claim 5, wherein said optical path is defined by a temperature insensitive $NaBi(Mo_{1-x}W_xO_4)_2$ etalon and said FoM is determined to be CTE+(1/n)(dn/dT), where n is the refractive index of the crystalline material of said $NaBi(Mo_{1-x}W_xO_4)_2$ etalon, and said FoM is small or essentially zero.

7. The device of claim 6, wherein dn/dT of the wavelength discriminating component is relatively insensitive to temperature and wavelength over the operating range of interest.

8. The device of claim 5, wherein x=0.25 and said FoM is essentially zero.

9. A WDM optical transmitter for operation over a range of temperatures, comprising:
   a source for generating an output signal at any one of a multiplicity of different wavelengths;
   means for tuning the wavelength of said source to a predetermined one of said wavelengths; and
   a feedback loop including a frequency discriminator for stabilizing the wavelength of said source at said predetermined wavelength, said frequency discriminator including a $NaBi(Mo_{1-x}W_xO_4)_2$ etalon, said etalon having a FoM and a CTE and a dn/dT that are mutually adapted to satisfy a desired FoM specification over said range of temperatures.

10. The WDM optical transmitter of claim 9, wherein said dn/dT of a wavelength discriminating component is relatively insensitive to temperature and wavelength over a predetermined operating range.

11. The WDM optical transmitter of claim 9, wherein said etalon is essentially temperature insensitive and said FoM is essentially zero.

12. The WDM optical transmitter of claim 9, wherein said means for tuning the wavelength of said source comprises a temperature controller.

13. The WDM optical transmitter of claim 9, wherein said means for tuning the wavelength of said source comprises electronic means.

14. A method of transmitting an optical signal over a range of temperatures comprising the steps of:

generating an output signal at any one of a multiplicity of different wavelengths;

tuning the wavelength of said output signal to a predetermined one of said wavelengths; and stabilizing the wavelength of said output signal at said predetermined wavelength by employing a $NaBi(Mo_{1-x}W_xO_4)_2$ etalon, said etalon having a FoM and a CTE and a dn/dT that are mutually adapted to satisfy said FoM over said range of temperatures.

15. The method of claim 14, wherein said dn/dT of the wavelength discriminating component is relatively insensitive to temperature and wavelength over a predetermined operating range.

16. The method of claim 14, wherein said etalon is essentially temperature insensitive and said FoM is essentially zero.

* * * * *